United States Patent Office 3,447,747
Patented June 3, 1969

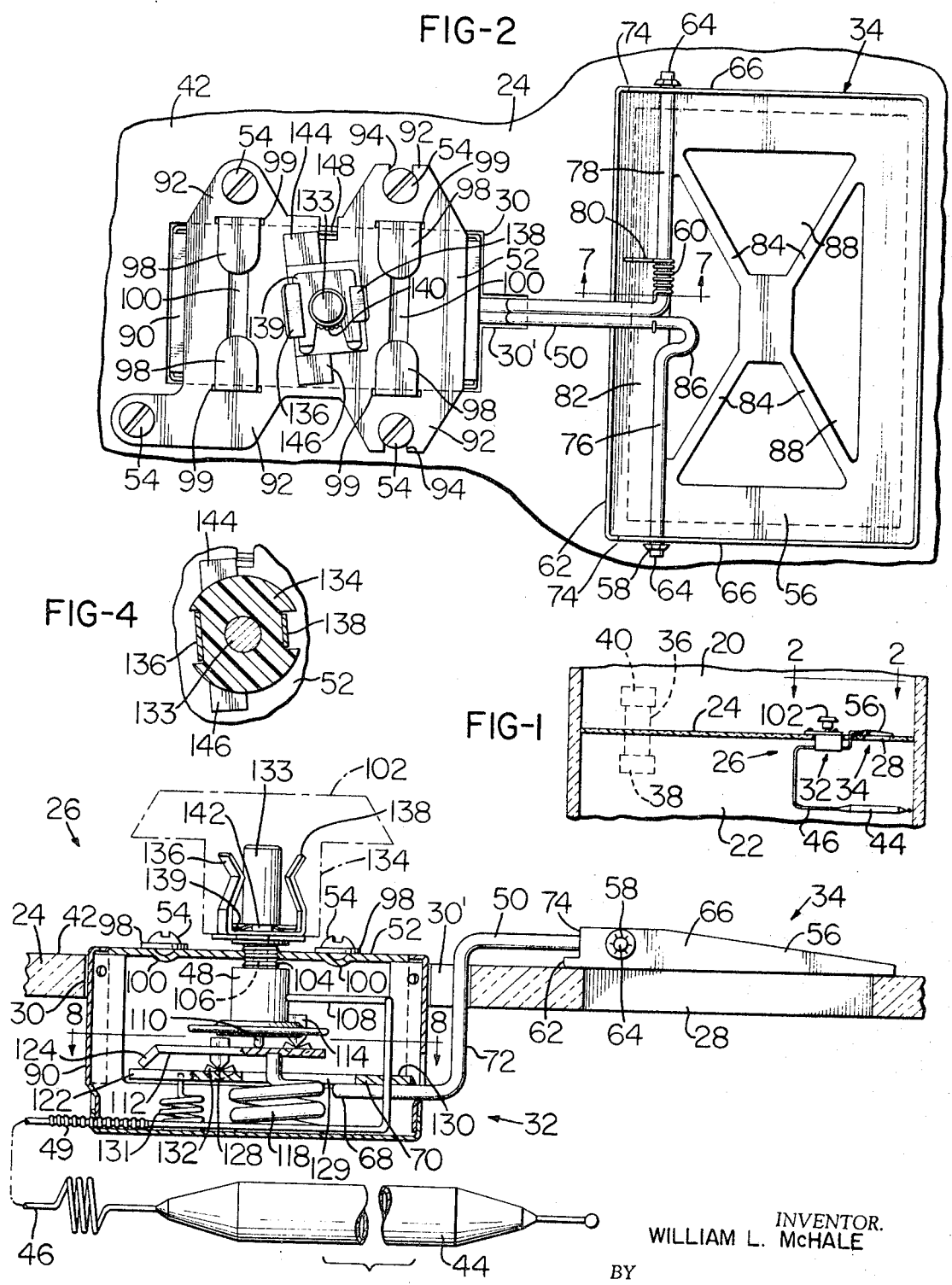

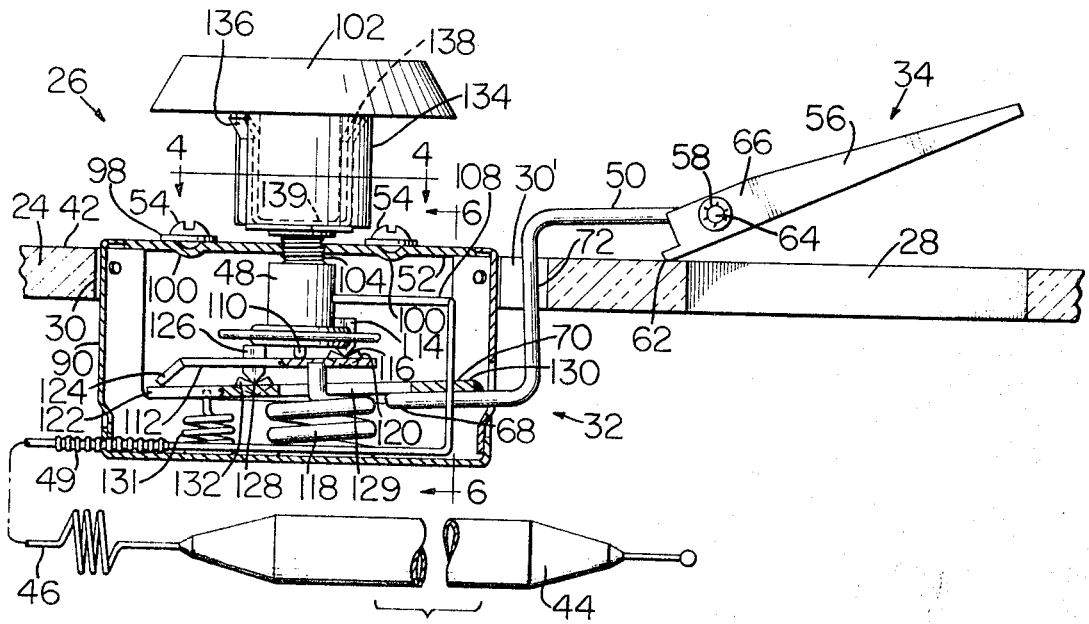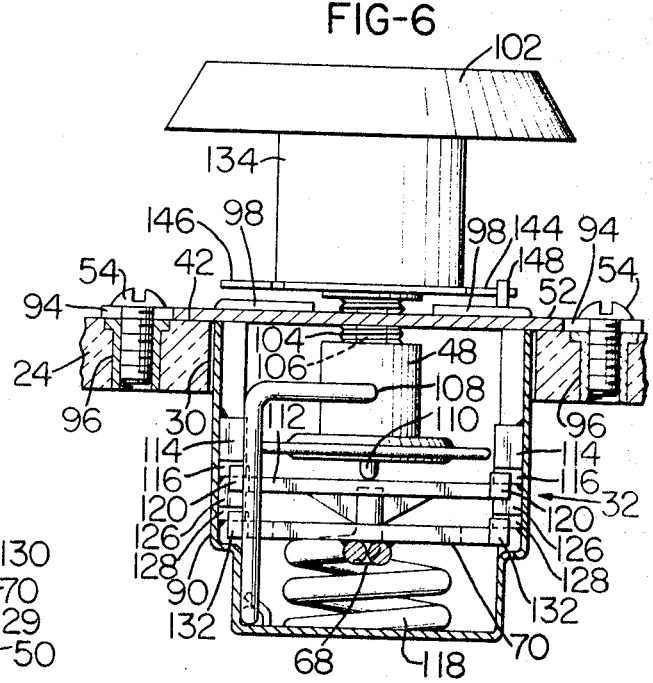

3,447,747
FLUID SYSTEM AND CONTROL THEREFOR,
AND METHOD
William L. McHale, Broomall, Pa., assignor to Robertshaw Controls Company, Richmond, Va., a corporation of Delaware
Filed Aug. 21, 1967, Ser. No. 661,959
Int. Cl. F25d 17/04
U.S. Cl. 236—49                                    16 Claims

ABSTRACT OF THE DISCLOSURE

This application discloses an air flow controller particularly useful in connection with a compartment separating wall between two compartments to be maintained at different temperatures. The controller has a thermostat to be placed in an aperture in the wall. A damper member is connected to the thermostat and is to be placed adjacent an air flow opening in the wall to regulate the flow of air between the two compartments. A thermostatic sensor or fluid bulb is placed in the compartment receiving the air flow. Such bulb is connected to the thermostat to regulate the position of the damper and the flow of air between the compartments. The controller can be received by a flat wall surface of the separating wall with a thermostat supporting plate and the flat damper over openings in the separating wall. The thermostat has levers controlled by a power element, and the levers can lift off their pivot points if the power element pusher overtravels.

---

This invention relates to a fluid system and control therefor, and method.

A feature of this invention includes a fluid or air controller particularly useful in connection with a compartment separating wall between two compartments to be maintained at different temperatures.

Another feature of this invention includes a controller having a thermostat and an air damper to be used in connection with said compartment separating wall.

Another feature of this invention includes a controller in which said thermostat is to be placed in aperture means of said wall and said damper is to be placed adjacent or over an air flow opening means in said wall.

Another feature includes a controller for use in connection with a domestic refrigerator or the like having a freezer compartment and an unfrozen food refrigerating compartment separated by said wall.

Another feature includes a controller for use with said refrigerator, in which said freezer compartment is maintained at a freezing temperature by a thermostatically controlled refrigerating system, and in which the unfrozen food compartment is maintained at a proper refrigerating temperature by variation of the flow of air through said air flow opening means by said damper under the control of the thermostat of this invention in response to a thermal sensing element in the unfrozen food compartment.

Another feature of this invention includes a thermostat having levers controlled by a thermostatic power element pusher and in which the levers can lift off their pivots if the power element pusher overtravels.

Another feature of this invention includes a novel method of controlling temperatures in a construction having a compartment separating wall.

Other features of this invention are apparent from this description, the appended claimed subject matter and/or the accompanying drawings, in which:

FIGURE 1 is a diagrammatic cross section of two adjacent compartments of a refrigerator and the like, provided with a controller according to this invention.

FIGURE 2 is an enlarged plan view of a portion of FIGURE 1, taken along the line 2—2 of FIGURE 1, with the knob omitted.

FIGURE 3 is a diagrammatic cross section, partly in elevation, transverse to FIGURE 2.

FIGURE 4 is a diagrammatic cross section along the line 4—4 of FIGURE 5.

FIGURE 5 is a view somewhat similar to FIGURE 3, and showing certain parts in different positions.

FIGURE 6 is a diagrammatic cross section along the line 6—6 of FIGURE 5.

FIGURE 7 is a diagrammatic cross section along the line 7—7 of FIGURE 2.

FIGURE 8 is a diagrammatic cross section of a portion of FIGURE 3 taken along the line 8—8 of FIGURE 3.

Certain words may be used in this specification and claimed subject matter indicating direction, relative position and the like. These words are used for the sake of brevity and clearness. However, it is to be understood that such words are used in connection with the views of the drawings, and that in actual use such parts may have entirely different direction, relative position and the like. Examples of such words are "vertical," "horizontal," "upper," and "lower," etc.

This invention relates to the control of temperatures of generally adjacent compartments or spaces 20 and 22, in a construction such as a domestic refrigerator. For example, the space 20 may be the freezer compartment of the domestic refrigerator, and the space 22 may be the unfrozen food compartment of such refrigerator. These compartments may be separated by any suitable compartment separating wall or wall means 24, which may be insulation in character, and is diagrammatically illustrated.

A controller unit or controller means 26, FIGURE 1, may be mounted on the compartment separating wall 24 to control the flow of air between the compartment 20 and 22 in a manner to maintain the desired temperature in compartment 22 by the amount of air passing from the compartment 20 to the compartment 22 under the control of such unit 26.

The controller unit 26 preferably is made in such a manner that the unit 26 may be readily mounted on the compartment separating wall 24 merely by providing an air flow opening or opening means 28 and a thermostat receiving aperture means 30 in the separating wall 24. The air flow opening means 28, and the thermostat receiving aperture means 30 may be separate openings in the wall 24, or they may be single openings, with different portions to cooperate with the parts of the controller unit 26, in a manner to be described.

A thermostat, or thermostat means 32 may be secured in said thermostat receiving aperture 30. A damper means 34 may be placed adjacent said air flow opening 28 in a manner to regulate the flow of air between the compartments 20 and 22 through said air flow opening 28.

If desired, additional air flow means 36 may be provided to produce a portion of the air flow between the compartments 20 and 22. The controller unit 26 of this invention may control a variable flow of air between the compartments 20 and 22 properly to maintain the temperature of the compartment 22. The variable flow of air controlled by unit 26 and the flow of air through the means 36 maintain the desired temperature in compartment 22. If desired, the means 36 may include an air opening 38 in the compartment 22, and an air opening 40 in the compartment 20, with the air being moved through air flow means 36 by gravity or by a small motor and fan in means 36 if desired. Such fan may maintain a slightly higher air pressure in compartment 20 than in compartment 22, and the controller 26 can permit a variable volume of air to pass from compartment 20 into compartment 22 to maintain the desired non-freezing refrigerating temperature in compartment 22. A separate thermostat in compartment 20 may control the refrigeration unit to maintain the desired freezing temperature in the compartment 20.

An important advantage of applicant's controller unit or controller means 26 is that it can be readily mounted on the wall 24 without any complicated structural changes in the wall 24 other than the provision of the air flow opening means 28, and the thermostat receiving aperture means 30, which may be of any relatively uncomplicated construction. Thus, the controller unit 26 may be mounted by downwardly moving the parts into engagement with the flat wall surface 42 of the separating wall 24.

While the invention is specifically described in connection with compartments 20 and 22 of a domestic refrigerator, with the freezer compartment 20 above the unfrozen food refrigerating compartment 22, it is to be understood that the invention is applicable to many other compartment constructions, as is readily apparent.

A thermostatic sensing means or member 44 which may be a fluid bulb may be connected by the fluid tube 46 to the thermostat 32, and specifically with the flexible bellows power element 48 of the thermostat 32. The bulb 44, tube 46, and power element 48 may contain any suitable fluid for transferring the change in pressures in the bulb 44 to the power unit 48. For example, such fluid may be any of the well known liquids which remain in liquid condition at all temperatures likely to be encountered by the controller unit 26 of this invention. Preferably, the bulb 44 is provided with sufficient fluid containing capacity, of relatively large proportion, or ratio, to make any ambient temperature compensating devices unnecessary. The tube 46 may be protected by a protecting sleeve 49 where it enters the thermostat 32.

A thermostatic damper actuating means, or rockable supporting arm 50 may be provided on the thermostat 32 for actuating the damper 34 to regulate the flow of air through the air flow opening means 28 in response to air temperature in the one compartment being regulated, such as the compartment 22. The bulb 44, thermostat 32, and damper 34, maintain the compartment 22 at any desired refrigerating and non-freezing temperature.

The thermostat 32 or thermostat means 32 may be provided with a flat thermostat supporting plate 52 which may be secured on the flat wall surface 42 by any suitable means, such as a screw 54, which may be screwed into the wall 24 in any suitable manner later to be described.

The damper means 34 may include a generally flat damper member 56 adjacent to the flat wall surface 42 and over said air flow opening 28.

The rockable supporting arm 50 may have hinge means 58 connected to said flat damper member 56. The rockable supporting arm 50 and the hinge means 58 may be provided with spring biasing means 60 to bias the flat damper member 56 in a manner to hold one edge or shallow flange 62 of the damper member 56 against the wall surface 42 while rocking the damper member 56.

For example, the rocker arm 50 may be made of a single piece of strong wire with its ends 64 extending out through the side flanges 66 of the flat damper member 56. The wire 50 may have a U-shaped bend 68, which may be brazed or soldered to a secondary lever 70, to be described. The double wire 50 may have an upward vertical section 72, which may pass upwardly through the narrow portion 30' of the aperture means 30, which then passes over the upper edge of the shallow flange 62 of the damper 56. The shallow flange 62 is formed by the downward shoulders 74 on the side flanges 66. The doubled wire 50 may then branch into the outward sections 76 and 78, which extend out and form the ends 64 which are part of the hinge means 58. Suitable lock washers or flanges are secured on the outside of side flanges 66 on the wire ends 64.

The coil spring 60 may have one end wrapped around the section 76 of the wire 50, and may be curled around the section 78 of the wire 50 and may have a downwardly biased arm 80, which bears down on the bottom 82 of the flat damper member 56.

The damper member 56 may be formed in the shape of an upwardly open pan with reinforcing sections or ridges 84. If the pan 56 is provided with an imperforate bottom 82, then a loop 86 may be provided in the wire branch 76, which may engage the flat bottom 82 of the damper pan 56 when the pan hinges upwardly, as in FIGURE 5. The loop 86 may limit the upward hinge movement of the pan, so that the edge or flange 62 will not snap into the opening 28, and possibly lock the pan in the opening 28.

Alternatively, the bottom 82 of the damper member 56 may be provided with openings 88, which are separated by the ridges or ribbons 84. Such construction for the pan or damper 56 may be used, when it is designed to allow a relatively large amount of air to flow continuously through the opening 28, even when the damper 56 is in the down position of FIGURE 3. Under such conditions, the loop 86 may engage an inner edge of the rectangular rim of the bottom 82 and thus prevent the damper from hinging too far upward to become locked in the opening 28.

The thermostat 32 may include a thermostat casing 90 which may be generally rectangular in horizontal cross section, with opposed substantially parallel vertical side walls of any suitable construction. Such side walls may be secured to the flat thermostat supporting plate 52, so that the casing may be supported by the plate 52 and the casing 90 may extend downwardly through the thermostat receiving aperture 30.

The thermostat supporting plate 52 has horizontal support flange means or flanges 92 which extend laterally beyond the thermostat casing 90, with said flange means 92 engaging the flat wall surface 42 and being secured to the separating wall 24 by the screws 54, which pass through holes or notches 94 in the flange means 92. If desired, the screws 54 may be received in threaded bushings 96 which are inserted in the wall 24, or the screws 54 may be used without such bushings, if desired, depending on the construction of wall 24.

The flat plate 52 may be secured to the casing 90 by means of the bent tongues or flanges 98, which extend upwardly from the side walls of the casing 90 through suitable openings 99 in the plate 52. The flanges 98 are then bent downwardly to secure the plate 52 and casing 90 together. If desired, the plate 52 may be provided with reinforcing troughs or channels 100, to render the plate 92 more rigid.

If the wall 24 is sufficiently thin in construction, then the casing 90 may extend downwardly from the upper flat surface of such wall 24 through aperture 30 into the compartment 22.

A thermostat adjusting means may be provided, which may be any suitable handle or knob 102. Such adjusting means may also include an adjusting screw 104 which is threaded, and engages a threaded opening in the plate 52, so that turning of the screw 104 raises and lowers the screw 104 which engages the upper portion of the power element 48. The screw 104 moves the power element 48 upwardly and downwardly without turning the element 48. For example, the power element 48 may be provided with an upward pin 106, FIGURES 3 and 6, which is received in an upward opening in the screw 104. In this manner turning of the screw 104 raises and lowers the pin 106, and thus raises and lowers the power element 48, which is prevented from turning with the screw by any suitable means, which may include the top horizontal portion 108 of the tube 46. Any additional slot and slidable pin construction may be used, not shown, for holding the power element 48 from turning, while the screw 104 is turned, as is obvious.

The thermostat 32 may be provided with a lever, fulcrum, and compression spring construction, which allows the lever construction to lift off or move away from the pivot points of the lever construction to prevent any unduly high stresses from developing if the pushing element 110 of the power element 48 should overshoot.

For example, the thermostatic power element 48 is provided with the longitudinal direction pushing element 110. This element 110 engages a primary lever 112 which has an intermediate portion pushed by the pushing element 110, in a downward direction, in the FIGURES 3, 5 and 6. The lever 112 may have a generally flat plate construction.

Primary pivot means or lugs 114 may be secured to opposite side walls of the casing 90 with primary pivot points 116. The pivot points 116 may be knife shaped, if desired. The primary pivot means 114 and pivot points 116 engage the primary lever 112 on one side of the pushing element 110. Such pivot means 114 and pivot points 116 are carried by the casing 90 and are directed in the same longitudinal direction of the pushing element 110. A primary compression spring 118 upwardly pushes the primary lever 112 intermediate the pushing element 110 and the pivot points 116. The lower end of the spring 118 is received by the bottom plate of the casing 90, and the upper end of the spring 118 is received in a notch or indentation in the plate-like primary lever 112. The primary lever 112 has upward pivot troughs 120 which extend out from the sides of the lever 112, FIGURES 6 and 8. The troughs 120 receive the pivot points 116 in such a manner that if the pushing element 110 overshoots, then the troughs 120 can be pushed down or lifted off away from the pivot points 116.

The secondary lever 70 is also a plate-like lever and is engaged at a first secondary lever end 122 by the other side or end 124 of primary lever 112. Secondary pivot means or lugs 126 engage the secondary levers 70 intermediate its lever ends. These secondary lugs 126 have secondary pivot points 128. The lugs 126 and pivot points 128 are carried by the casing 90 and are directed in the same longitudinal direction of the pushing element 110. The second end 130 of the secondary lever 70 is connected or welded to the thermostatic damper actuating means or arm 50 adjacent the U-bend 68. The lever 70 has an opening 129 to permit the primary compression spring 118 to pass and engage the primary lever 112.

A secondary compression coil spring 131 pushes the secondary lever 70 intermediate the first seconadry lever end 122 and the said secondary pivot points 128. The secondary lever 70 has upward channels or troughs 132 which upwardly engage the downward secondary pivot points 128. The channels or troughs extend out from the sides of the plate-like lever 70.

The construction is such that the secondary lever 70 may be pushed off or downwardly from the secondary pivot points 128, if the primary lever 112 should push the lever 70 in an overshooting action. The result is that both the primary lever 112, and the secondary lever 70, may be respectively lifted off or downwardly from their respective pivot points if there should be an overshooting action by the pushing element 110.

While the disclosure has been specifically described with the flow of air moving from the colder compartment 20, to the warmer compartment 22, and with the thermostatic bulb 44 in the lower compartment 22, it is to be understood that the flow of air may be in a reverse direction, if the pressures produced in the compartments produce a pressure differential in that direction. Also, the thermostatic bulb 44 may be placed in the upper compartment, merely by making the aperture means 30 sufficiently large to allow the tube 46 to be passed through the aperture means 30, into the upper compartment.

Any suitable means for securing the knob 102 to the screw 104 may be provided. For example, the screw 104 may have an upper unthreaded cylindrical portion 133 which receives the lower hub 134 of the knob 102. Any suitable means for permitting the knob 102 to be pushed downwardly over the unthreaded end 132 may be provided. For example, two spring members 136 and 138 of a central disc 139 may extend into vertical slots on the outside of knob hub 134. The disc 139 may have a toothed tongue 140 which extends into an indented circular groove 142 in the screw construction 104.

The disc construction 139 may have turning limiting flanges 144 and 146 to limit the rotation of the knob and screw construction. The flange 144 is shown to be in engagement with a limiting tongue 148 which extends upwardly from the casing 90. The tongue 146 may also engage the limiting tongue upon rotation of the screw 104. This establishes upper and lower temperature limits for compartment 22.

It is thus to be seen that a new, unobvious and useful fluid system and control therefor have been provided.

While the form of the invention now preferred has been disclosed, as required by statute, other forms may be used, all coming within the scope of the claimed subject matter which follows.

What is claimed is:

1. For use with a compartment substantially flat separating wall having a substantially flat wall surface and separating two adjacent compartments and having an air flow opening passing through said wall and said wall surface and connecting said compartments and having a thermostat receiving aperture adjacent to and laterally spaced from said air flow opening and passing through said wall and said wall surface, and wherein the improvement comprises, in combination:

a thermostat having a portion to be secured over said substantially flat wall surface and another portion to be supported in said thermostat receiving aperture of said compartment substantially flat separating wall;

a generally flat damper member to engage said substantially flat wall surface and extend over said air flow opening to regulate the flow of air between said compartments through said air flow opening;

thermostatic sensing means to be placed in one of said compartments and connected to said thermostat; and thermostatic damper actuating means on said thermostat responsive to said sensing means and actuating said damper member to regulate said flow of air through said air flow opening in response to air temperatures in said one of said compartments.

2. A combination according to claim 1 in which said first named portion of said thermostat is a thermostat supporting flat plate to be secured over said substantially flat wall surface.

3. A combination according to claim 2 in which said second named portion of said thermostat is a thermostat casing secured to said flat plate and supported in said thermostat receiving aperture, and has an adjusting screw extending through said flat plate with an adjusting knob over said flat plate.

4. A combination according to claim 1 in which said thermostatic damper actuating means includes a rockable supporting arm extending from said thermostat and rocking said flat damper member.

5. A combination according to claim 4 in which said rockable supporting arm has hinge means connected to said flat damper member.

6. A combination according to claim 5 in which said hinge means includes spring biasing means to bias said flat damper member to hold one edge of said damper member against said wall surface while rocking said damper member.

7. A combination according to claim 4 in which said rockable supporting arm extends from said thermostat through said thermostat receiving aperture means to said flat damper member.

8. A combination according to claim 2 in which said thermostat supporting plate has support flange means extending laterally beyond said thermostat casing, said flange means to engage said flat wall surface and to be secured to said compartment separating wall.

9. For use with a compartment separating wall separating two adjacent compartments and having an air flow opening means connecting said compartments and having a thermostat receiving aperture means, and wherein the improvement comprises, in combination:
 a thermostat to be secured in said thermostat receiving aperture means of said compartment separating wall;
 damper means to be adjacent said air flow opening means and movable to regulate the flow of air between said compartments through said air flow opening means;
 thermostatic sensing means to be placed in one of said compartments and connected to said thermostat;
 and thermostatic damper actuating means on said thermostat responsive to said sensing means and actuating said damper means to regulate said flow of air through said air flow means in response to air temperatures in said one of said compartments, and with said thermostat having a thermostat casing with a thermostatic power element having a longitudinal direction pushing element, a primary lever having an intermediate portion pushed by said pushing element, primary pivot means engaging said primary lever on one side of said pushing element with primary pivot points carried by said casing and directed in said longitudinal direction, a primary compression spring pushing said primary lever toward said pushing element intermediate said pushing element and said pivot points, a secondary lever engaged adjacent a first secondary lever end by the other side of said primary lever, secondary pivot means engaging said secondary lever intermediate its lever ends and having secondary pivot points carried by said casing and directed in said longitudinal direction, the second end of said secondary lever being connected to said thermostatic damper actuating means, and a secondary compression spring pushing said secondary lever toward said other side of said primary lever intermediate said first secondary lever end and said secondary pivot points, said primary and secondary levers being lifted off said pivot points by overtravel of said pushing element.

10. A combination according to claim 9 with said separating wall having a substantially flat surface and with said casing having a flat thermostat supporting plate secured to said flat wall surface and with the main body of said casing extending into said thermostat receiving aperture means, and with said damper means including a flat damper member adjacent said flat wall surface and over said air flow opening means to allow said thermostat and damper means to be easily applied to said separating wall.

11. A combination according to claim 10 with said thermostatic power element being a flexible fluid expansible power element pushed toward said flat supporting plate, and power element adjusting screw means engaging said power element, said adjusting screw means threadedly engaging and passing through said flat supporting plate.

12. A combination according to claim 11 with a thermostatic fluid bulb in one of said compartments, and with a connecting fluid tube connected to said fluid bulb and to said power element.

13. A combination according to claim 12 with a manually operable adjusting means at an end of said adjusting screw means.

14. In combination:
 a thermostat having a thermostatic power element, having a longitudinal direction pushing element;
 a primary lever having an intermediate position pushed by said pushing element;
 primary pivot means engaging said primary lever on one side of said pushing element with primary pivot points directed in said longitudinal direction;
 a primary compression spring pushing said primary lever toward said pushing element intermediate said pushing element and said pivot points;
 a secondary lever engaged adjacent a first secondary lever end by the other side of said primary lever;
 secondary pivot means engaging said secondary lever intermediate its lever ends and having pivot points directed in said longitudinal direction, the second end of said secondary lever to be connected to an element to be regulated;
 and a secondary compression spring pushing said secondary lever toward said other side of said primary lever intermediate said first secondary lever end and said secondary pivot points;
 said primary and secondary levers being lifted off said pivot points by overtravel of said pushing element.

15. A combination according to claim 14 with said thermostatic power element being a fluid expansible power element pushed toward a flat plate, and power element adjusting screw means engaging said power element and threadedly engaging and passing through said flat plate.

16. In a method of controlling temperatures in a construction having a compartment substantially flat separating wall having a substantially flat wall surface and separating two adjacent compartments and having an air flow opening passing through said wall and wall surface and connecting said compartments and having a thermostat receiving aperture adjacent to and laterally spaced from said air flow opening and passing through said wall and said wall surface, and wherein the improvement comprises:
 securing a thermostat with a portion secured over said substantially flat wall portion and with another portion supported in said thermostat receiving aperture;
 placing a generally flat damper member engaging said substantially flat wall surface, extending over said air flow opening, and being laterally spaced from said thermostat to regulate the flow of air between said compartments through said air flow opening;
 placing a thermostatic sensing means in one of said compartments and which is connected to said thermostat;
 and providing thermostatic damper actuating means on said thermostat responsive to said sensing means and extending laterally and actuating said damper member to regulate said flow of air through said air flow opening in response to air temperature in said one of said compartments.

References Cited

UNITED STATES PATENTS

| 1,652,216 | 12/1927 | Replogle | 236—49 |
| 1,826,308 | 10/1931 | Fiske | 62—187 |
| 2,118,580 | 5/1938 | Wagner | 62—187 |
| 2,462,279 | 2/1949 | Passman | 62—187 |
| 2,626,106 | 1/1953 | Voss | 236—49 |
| 3,104,533 | 9/1963 | O'Connell | 62—187 |
| 3,126,716 | 3/1964 | De Witte | 62—187 |
| 3,129,886 | 4/1964 | Lieberman | 62—187 |
| 3,149,781 | 9/1964 | Cowing | 62—180 |
| 3,288,370 | 11/1966 | Mingrone | 62—187 |

WILLIAM J. WYE, Primary Examiner.

U.S. Cl. X.R.

62—187